UNITED STATES PATENT OFFICE.

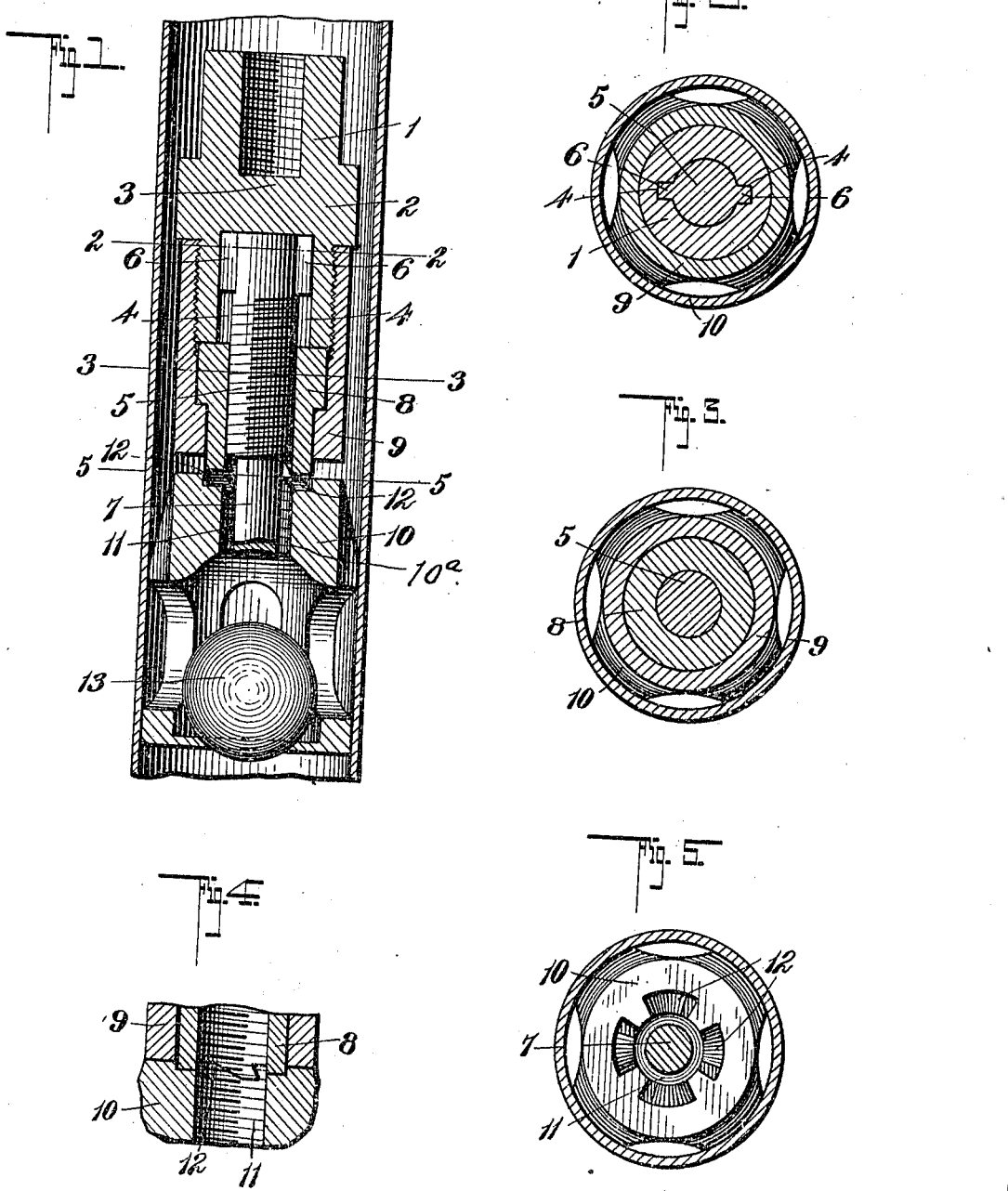

JOHN B. OEINK, OF FULDA, OHIO.

OIL-VALVE THREAD-PRESERVER.

955,987.

Specification of Letters Patent. Patented Apr. 26, 1910.

Application filed March 15, 1909. Serial No. 483,593.

*To all whom it may concern:*

Be it known that I, JOHN B. OEINK, a citizen of the United States, residing at Fulda, in the county of Noble and State of Ohio, have invented a new and useful Improvement in Oil-Valve Thread-Preservers, of which the following is a specification.

This invention relates to a thread preserver adapted especially for use in connection with oil well valves.

As a matter of economy it is desirable to draw both the plunger and the stationary valve from the oil well at the same time which requires connecting the two together by some mechanical means. The common and most satisfactory way is by means of a threaded bolt attached to the plunger and which is screwed into the stationary valve when the latter is to be drawn. This of course is possible only when the threads upon the bolt and in the socket of the stationary valve are in good condition. But oil well pumpers very often force the stationary valve into position, especially after oil pressure has forced it up, by dropping the plunger upon the stationary valve, and this would cause the destruction of the threads upon the bolt and also those formed in the stationary valve, and might also cause the plunger and valve to become jammed or locked together. It is very common therefore for the pumpers to knock off the threaded bolt carried by the plunger, thus leaving no means for drawing out plunger and valve together.

The object of this invention is to provide a protecting device for the threaded bolt which will allow the plunger to be dropped at any time upon the stationary valve without injuring any of the threads, and which will also permit the threaded bolt to be secured into the stationary valve without removing the protecting device. It will be obvious that any form of protector would have to be removed in order to use the bolt, or it would not serve the object of this invention, the drawing of plunger and valve at the same time, as it would be necessary to draw the plunger by itself in order to remove the protecting device. I therefore consider it essential that the protecting device be of such a construction that it will effectually protect the threads of the bolt during all the pumping operations, but will not interfere with the screwing the said bolt into the stationary valve, when it is desired to withdraw the plunger and valve.

The invention therefore consists of the novel features hereinafter described, pointed out in the claims and shown in the accompanying drawings, in which, Figure 1 is a longitudinal section through the lower or stationary valve and through my attachment, the bolt being shown in elevation. Fig. 2 is a section on the line 2—2 of Fig. 1. Fig. 3 is a section on the line 3—3 of Fig. 1. Fig. 4 is a detail sectional view illustrating a certain ratchet construction. Fig. 5 is a section on the line 5—5 of Fig. 1, showing the stationary valve casing in plan.

In these drawings, 1 represents a cylindrical sleeve which is to be secured to the shoe of the lower plunger, said shoe and plunger not being shown, as they are of the ordinary construction now in use, and this sleeve is provided with a collar 2 midway its ends, and is also provided with a transverse partition 3. The lower part of the sleeve is provided with two straight grooves 4 and the exterior of the lower portion of the sleeve is threaded. A bolt 5 has its head provided with oppositely placed lugs 6 which slide into the grooves 4 and the bolt is threaded up to the head. The bolt is also provided with a slightly reduced projecting end portion 7. A threaded preserver is formed of a flanged sleeve 8 threaded to fit the bolt, and of less length than the threaded portion of the bolt, and this sleeve is held between the lower end of the sleeve 1 and the lower flanged end of a casing 9 which is threaded upon the lower portion of the sleeve 1, the flange of the casing 9 engaging the flange of the sleeve 8. A stationary valve casing 10 is provided at its upper end with a central bore 11 through which projects the smooth portion of the bolt and surrounding this bore 11 the upper face of the casing 10 is indented or cut to form a ratchet as shown at 12, the lower end of the sleeve 8 being provided with opposite ratchet members, which coöperate with the ratchet of the casing 10. When the plunger is dropped the sleeve 8 will engage the ratchet face of the casing 10 and by reason of such ratchet construction the sleeve 8 and casing 10 will be held against relative rotating movement during rotation of the plunger and the sleeve 1. The rotation of these parts will rotate the bolt, and as the casing 8 is held against rotation the bolt will be forced downwardly until its threaded portion engages the threads formed in the bore 10ª. The smooth projecting portion of the bolt will at any time, when the sleeve 8 is dropped upon the stationary valve enter the casing 10 and will dislodge the ball valve 13 in case the same shall have for any reason stuck to the roof of the casing.

What I claim is:—

1. A thread preserver consisting of a bolt, a holding sleeve, said sleeve holding the bolt against rotation relative to the sleeve, a sleeve threaded to receive the bolt, and a casing threaded upon the first mentioned sleeve and loosely engaging and holding the second mentioned sleeve.

2. A device of the kind described comprising a sleeve a portion of which is provided with interior grooves, a bolt having a head sliding in said sleeve, lugs formed upon said head, the lugs engaging the grooves of the sleeve, a flanged casing threaded upon the sleeve, and a flanged sleeve interiorly threaded to receive the threads of the bolt, the flange of the second mentioned sleeve being held between the flange of the casing and an end of the first mentioned sleeve.

3. The combination with an oil well plunger, a sleeve threaded thereon, a bolt having a head slidably and non-rotatably held in said sleeve, a casing threaded upon said sleeve, a threaded sleeve held by said casing and through which the bolt works, and a stationary valve casing provided with a ratchet face, for engagement with the second mentioned sleeve, an end of the sleeve coöperating with said ratchet face, and the said stationary valve casing having a threaded bore to receive the bolt.

4. The combination with a stationary valve and plunger cage, the sliding cage being rotatable, a sleeve secured thereon, and rotating with said sliding cage, a bolt slidably held in said sleeve, and rotating with the sleeve, a second sleeve threaded to receive the bolt, means for loosely connecting said sleeve to the first mentioned sleeve, a stationary valve cage having a threaded bore to receive the bolt, a reduced smooth extension carried by the bolt and working through said bore and means for inter-locking the second mentioned sleeve and the stationary valve cage, to hold said second sleeve against rotation during rotation of the first mentioned sleeve, as and for the purpose set forth.

JOHN B. OEINK.

Witnesses:
   E. W. WICKHAM,
   KATE ARCHER.